US012014856B2

(12) United States Patent
Tepper et al.

(10) Patent No.: US 12,014,856 B2
(45) Date of Patent: Jun. 18, 2024

(54) AIR-COOLED DRY-TYPE TRANSFORMER

(71) Applicant: HITACHI ENERGY LTD, Zürich (CH)

(72) Inventors: Jens Tepper, Brilon (DE); Yong Wang, Brilon (DE)

(73) Assignee: HITACHI ENERGY LTD, Zürich (CH)

( * ) Notice: Subject to any disclaimer, the term of this patent is extended or adjusted under 35 U.S.C. 154(b) by 1152 days.

(21) Appl. No.: 16/533,807

(22) Filed: Aug. 7, 2019

(65) Prior Publication Data

US 2019/0362879 A1 Nov. 28, 2019

Related U.S. Application Data

(63) Continuation of application No. PCT/EP2018/053180, filed on Feb. 8, 2018.

(30) Foreign Application Priority Data

Feb. 8, 2017 (DE) ......................... 102017102436.0

(51) Int. Cl.

| | |
|---|---|
| ***H01F 27/08*** | (2006.01) |
| ***H01F 27/28*** | (2006.01) |
| ***H01F 27/32*** | (2006.01) |

(52) U.S. Cl.

CPC ....... *H01F 27/085* (2013.01); *H01F 27/2876* (2013.01); *H01F 27/327* (2013.01); *H01F 2027/328* (2013.01)

(58) Field of Classification Search

CPC .. H01F 27/085; H01F 27/2876; H01F 27/327; H01F 2027/328; H01F 30/10

See application file for complete search history.

(56) References Cited

U.S. PATENT DOCUMENTS 10,026,541 B2 * 7/2018 Shiota ................. H01F 27/2876
10,832,850 B2 * 11/2020 Ovando .................. H01F 27/29

(Continued)

FOREIGN PATENT DOCUMENTS

AU 2008243055 B2 * 8/2009 ............. B60H 1/248
CN 102804293 A 11/2012

(Continued)

OTHER PUBLICATIONS

Notice of Grounds for Rejection for Korean Patent Application No. 10-2019-7024999, dated Feb. 3, 2022, 8 pages.

(Continued)

*Primary Examiner* — Tuyen T Nguyen
(74) *Attorney, Agent, or Firm* — Sage Patent Group

(57) ABSTRACT

An air-cooled dry-type transformer includes: a core provided with a branch; a winding body arranged about the branch; a cooling channel extending in a direction of a longitudinal axis of the winding body, the cooling channel being arranged between an inner part of the winding body and an outer part of the winding body, the cooling channel having openings at both ends and a substantially ring-shaped cross section with a round, oval, or polygonal basic shape; and at least one ring ventilator comprising a ring and a blower. The blower suctions air and blows the air from the ring along a longitudinal axis of the ring, thereby generating an air flow. The at least one ring ventilator is dimensioned and mounted such that the air flow generates a cool air flow in the cooling channel.

15 Claims, 6 Drawing Sheets

(56) References Cited

U.S. PATENT DOCUMENTS

| | | | | |
|---|---|---|---|---|
| 2010/0328005 | A1* | 12/2010 | Sarver | H01F 27/327 336/199 |
| 2014/0132381 | A1* | 5/2014 | Weber | H01F 27/322 336/60 |
| 2015/0084214 | A1 | 3/2015 | Wilson et al. | |
| 2016/0153673 | A1 | 6/2016 | Staniforth et al. | |
| 2016/0329145 | A1 | 11/2016 | Kang et al. | |

FOREIGN PATENT DOCUMENTS

| | | | | | |
|---|---|---|---|---|---|
| CN | 203036728 | U | * | 7/2013 | |
| CN | 103688322 | A | | 3/2014 | |
| CN | 103711681 | A | * | 4/2014 | |
| CN | 104575959 | A | | 4/2015 | |
| CN | 205159040 | U | * | 4/2016 | |
| EP | 3051546 | A1 | | 8/2016 | |
| JP | S6249216 | U | | 3/1987 | |
| JP | 2014504806 | A | * | 2/2014 | |
| JP | 2015228442 | A | | 12/2015 | |
| KR | 200466697 | Y1 | | 5/2013 | |
| WO | WO-2011026603 | A1 | * | 3/2011 | H01F 27/025 |
| WO | 2013096237 | A1 | | 6/2013 | |

OTHER PUBLICATIONS

1st Office Action, Chinese Patent Application No. 2018800010934X, dated Dec. 29, 2021, 12 pages.

Examiner's Action, European Patent Application No. 18708595.6, dated Jul. 22, 2020, 5 pages.

International Search Report of PCT/EP2018/053180, dated Jun. 29, 2018, pp. 1-5.

* cited by examiner

AIR-COOLED DRY-TYPE TRANSFORMER

CROSS-REFERENCE TO PRIOR APPLICATION

This application is a continuation of International Patent Application No. PCT/EP2018/053180, filed on Feb. 8, 2018, which claims priority to German Patent Application No. DE 10 2017 102 436.0, filed on Feb. 8, 2017. The entire disclosure of both applications is hereby incorporated by reference herein.

FIELD

The present disclosure relates to methods and devices for cooling of electrical power appliances, especially power transformers. In particular, it relates to methods and systems for cooling of dry-type transformers by means of ring ventilators, especially dry-type transformers in non-ventilated housings with forced air cooling inside the housing.

BACKGROUND

Various techniques have been proposed to improve the cooling of dry-type transformers. These include cooling air channels inside the core, in order to improve the heat dissipation. Generally speaking, a blower is used to generate an excess pressure in the lower area of the housing, while a negative pressure can be generated by extraction of the air in the upper region of the housing. In this way, an air flow is generated from bottom to top. However, a large amount of air does not flow as desired through the cooling channels of the windings, but instead on the outside around the coils in an unwanted manner. This is due, among other things, to the fact that the cross section area of the cooling channels inside the windings is usually significantly smaller than the cross section area between housing wall and coils.

This can generally be avoided by the following methods: on the one hand, the fan can be placed beneath the coils, in order to blow the air into the cooling channels. Furthermore, air baffles can be situated in direct proximity to the coils, so as to make the flow resistance of the cooling channels less than the flow resistance of the area outside the coils. In order to blow the air into the coils in this case, a relatively powerful fan is needed, while a large portion of the air still flows around the coils. Furthermore, in order to be sufficiently effective, the air baffles must be individually adapted to the contours of the coils, which involves a considerable labor expense. Because the airflow baffles furthermore generate a substantial additional resistance, the ventilation system operates with a lower overall efficiency. Also, on the whole, the improved cooling with traditional ventilators produces a lot of noise, especially due to the rotating blades.

Given this background, there is a need for the present invention.

SUMMARY

In an embodiment, the present invention provides an air-cooled dry-type transformer, comprising: a core provided with a branch; a winding body arranged about the branch; a cooling channel extending in a direction of a longitudinal axis of the winding body, the cooling channel being arranged between an inner part of the winding body and an outer part of the winding body, the cooling channel having openings at both ends and a substantially ring-shaped cross section with a round, oval, or polygonal basic shape; and at least one ring ventilator comprising a ring and a blower, the blower being configured to suction air and to blow the air from the ring along a longitudinal axis of the ring, thereby generating an air flow, wherein the at least one ring ventilator is dimensioned and mounted such that the air flow generates a cool air flow in the cooling channel.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
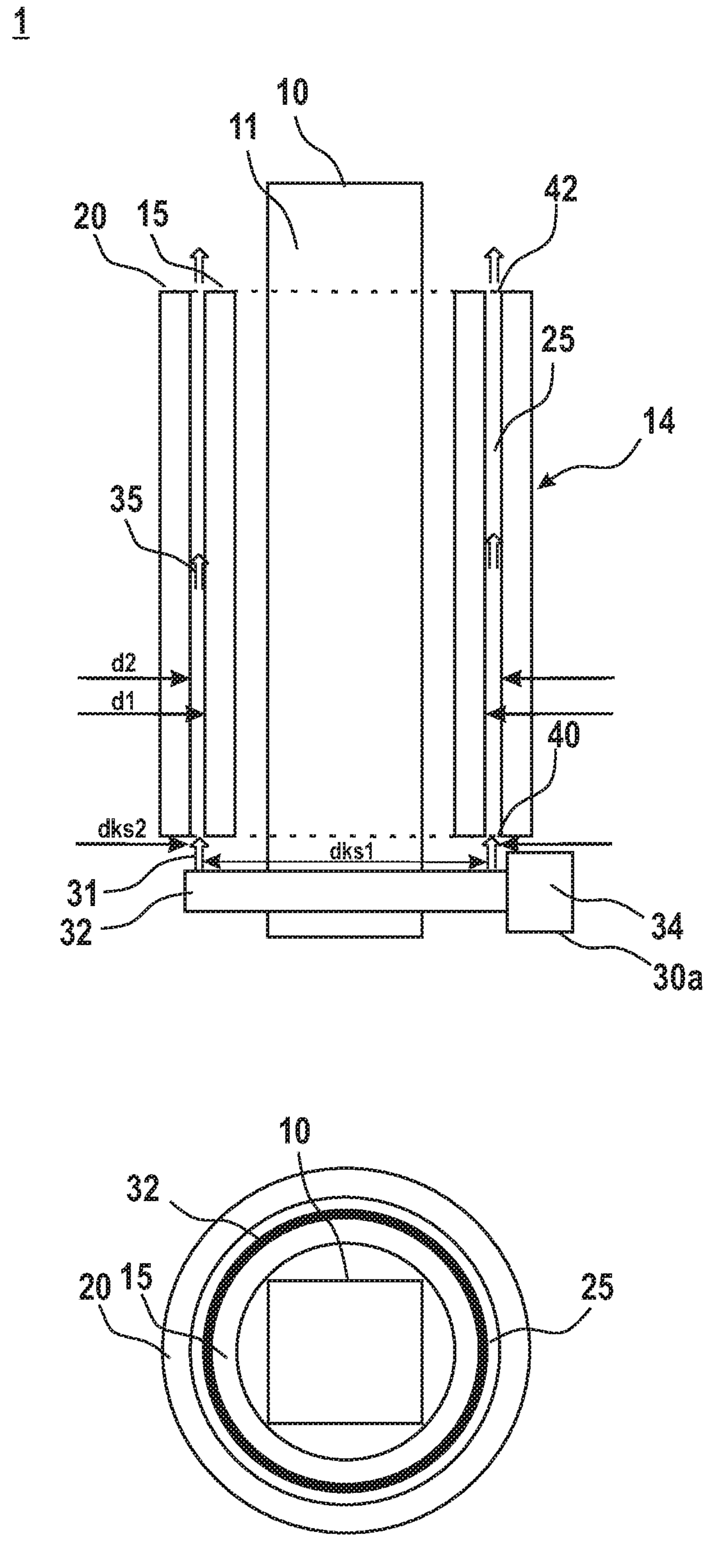
FIG. 1 shows a cross section through a dry-type transformer according to embodiments, as well as an upper view of the transformer.

In various aspects, the present invention provides an air-cooled dry-type transformer, a transformer cooling system, a method for cooling a dry-type transformer, a use of a ring ventilator, and an electrical power appliance with air cooling.

In a first aspect of the invention, an air-cooled dry-type transformer is provided. It comprises a core, comprising a branch; a winding body arranged about the branch;

- a cooling channel extending in the direction of the longitudinal axis of the winding body, the cooling channel being arranged between an inner part of the winding body and an outer part of the winding body, the cooling channel having openings at both ends and a substantially ring-shaped cross section with round, oval or polygonal basic shape; at least one ring ventilator comprising a ring and a blower, wherein the blower is designed to suction air and to blow the air from the ring along a longitudinal axis of the ring, thereby generating an air flow;
- wherein the ring ventilator is dimensioned and mounted such that the air flow generates a cooling air flow in the cooling channel.

The cooling channels described in this disclosure generally include all kinds of channels which are suitable for use or can be used according to aspects and embodiments for the guiding of cooling air or cooling gas through a dry-type transformer. For example, they may also be channels originally provided or serving for the purpose of dielectric insulation or the inspection/control of the field. The cooling channels described herein may be provided for example between a core and a winding, or inside a winding, between different windings, or on the outside of the winding body.

In a second aspect of the invention, a transformer cooling system is provided. This comprises a dry-type transformer according to the first aspect, a housing for the dry-type transformer, and a heat exchanger, which is designed to carry heat away from the housing; wherein the cooling air flow generated by the at least one ring ventilator after passing through the cooling channel of the dry-type transformer impinges on the heat exchanger and is cooled there.

In a third aspect, a method is provided for cooling a dry-type transformer. The method involves providing a ring ventilator and a dry-type transformer and directing a cooling air flow of the ring ventilator at a suitable, substantially ring-shaped opening of a cooling channel of the dry-type transformer.

In a further aspect, a use of a ring ventilator is proposed for the cooling of an electrical power appliance, wherein a directed, substantially ring-shaped cooling air flow of a ring ventilator is directed at a suitable opening of a cooling channel of the electrical power appliance.

In a further aspect, an electrical power appliance with air cooling is proposed. The device comprises an electrical power appliance with a cooling channel having at least one substantially ring-shaped opening, a ring ventilator comprising a ring and a blower, wherein the blower is designed to suction air and to blow the air along a longitudinal axis of the ring, thereby generating a cooling air flow in the cooling channel.

Further features and benefits of the present invention will be presented in the following detailed description of preferred embodiments of the system.

Even if preferred embodiments are being described, the scope of protection of the invention is not limited to the embodiments represented, but rather also encompasses embodiments which are obvious to the skilled person.

In general, embodiments of the invention relate to dry-type transformers with are cooled with at least one electrically operated ring ventilator. A ring ventilator as used in this disclosure comprises a ring-shaped housing from which a ring-shaped air flow emerges in the axial direction of the ring. In the middle of the housing there is a central opening, through which a branch of the transformer core runs or is situated therein in exemplary embodiments. In general, the term “ring ventilator” should be interpreted according to the above definition in this disclosure, including the variants described below.

A ring ventilator may have a ring-shaped housing as the stator, with a likewise ring-shaped rotor therein, on which blades are mounted, being visible on the outside as in a conventional fan. In another form used here, the ring ventilator in exemplary embodiments may be a bladeless ventilator. A bladeless ventilator blows the air from a ring, without rotating rotor vanes being directly involved, or these are typically encapsulated in an extra housing. The air is drawn in through an internally installed rotor in the base or at the side of the bladeless ventilator through holes located there, and taken to an encircling cavity of a ring. After this, the air is accelerated through a slot, which is preferably provided on the inside of the ring.

Thus, an air jet is produced, shaped according to the geometry of the ring. In order to channel the direction of the air jet, the jet is blown across a bevel, which is shaped somewhat like a supporting surface. At the same time, the surrounding air can be sucked in as a secondary flow, which strengthens the overall air flow from the ventilator. The present invention relates to the use of ring or bladeless ventilators for dry-type transformers and, in general, also for the cooling of other types of electrical devices or power appliances. Thanks to various measures, it is ensured that a major portion of the ventilated air is blown directly through cooling channels of the dry-type transformer, and does not flow past the outside of the coils/windings. In the following, it shall be assumed that the core of the transformer stands vertically with respect to the ground surface. This is fluidically advantageous, since the air flow generated by the ventilator is assisted and strengthened by the convection of the heated air. In exemplary embodiments, however, the core may also have different orientations, such as horizontal to the ground surface, so that the cooling air flow also moves horizontally. In the following, however, the technically usual vertically standing cores and branches will be assumed throughout.

Exemplary embodiments pertain in particular to the following cases: typically, the transformer is cooled by an air flow directed from bottom to top, which is generated by a ring or bladeless ventilator arranged in the lower area of the windings or directly beneath the windings. Alternatively, the air flow directed from bottom to top can also be generated by a ring or bladeless ventilator arranged in the upper area of the windings. Finally, the air flow may be generated by a ring or bladeless ventilator arranged both in the lower and in the upper area of the windings, that is, by a combination of the two aforementioned cases. If the windings are separate from each other in the vertical direction, i.e., along the longitudinal axis of the core, a ventilator can also be installed between the upper coil or winding and the lower coil or winding (in addition to the above described variants, or individually). For three separate windings on three branches of a three-phase current dry-type transformer, the above variants may be implemented individually for each branch, or a single ventilator with a ring can be used, wherein the ring is not round, but elongated, and covers all three windings on the three branches.

Embodiments have the following advantages over traditional ventilation techniques with conventional ventilators. On the one hand, the air baffles described at the beginning and their supporting device or connections can be totally eliminated. Furthermore, cooled air, cooled in embodiments for instance by a heat exchanger, can be guided through a pipe directly at the ventilator and then be blown into the cooling channels. This avoids needless heat exchange between the cooling air and the surroundings outside the windings. Therefore, the cooled air remains cool in the supply pipe to the ring or bladeless ventilator. The greater portion of the air accelerated through the ventilator flows directly into and through the cooling channels in the windings, and at the same time this is accomplished with slight or reduced construction expense. Furthermore, the bladeless ventilators or fans in particular work with low noise or sound level due to the absence of open rotating blades as in a conventional fan or blower.

FIG. 1 shows an air-cooled dry-type transformer 1 according to embodiments in cross section. This comprises a core 10 provided with a branch 11 as well as a winding body 14 arranged about the core 10 or the branch 11. The winding body 14 may have a plurality of windings or winding portions. A cooling channel 25 is located between an inner part 15 of the winding body 14 and an outer part 20 of the winding body 14. This has two openings 40, 42 at both ends, typically at bottom and top in the case of a vertical core 10 or branch 11. The cooling channel 25 typically, but not necessarily, has a substantially ring-like or ring-shaped cross section. The lower part of FIG. 1 shows a top view from above, the ring 32 being shown in black. The dry-type transformer 1 may also have a plurality of branches 11, such as two or three.

A ring ventilator 30 situated beneath the dry-type transformer 1 comprises a ring 32 and a blower 34 (see also FIG.

3). The blower 34 is designed to suction air from the surroundings (in embodiments, the air may be supplied through a pipe) and to blow the air out from a slot 33 in the ring 32 in directed fashion along a longitudinal axis of the ring 32. This generates a cooling air flow 35. The ring ventilator 30 is dimensioned and mounted such that it generates a ring-shaped cooling air flow 35 geometrically adapted to the dimensions of the cooling channel 25.

The cooling air flow 35 corresponds in its cross section profile and in its dimensions substantially to the cross section profile and dimensions of one of the openings 40, 42, therefore typically also the dimensions of the cooling channel 25. The cooling channel 25 typically has an inner cooling channel diameter d1 and an outer cooling channel diameter d2. These are substantially identical to the inner air flow diameter dks1 and the outer air flow diameter dks2 of the cooling air flow 31.

Figure 2:
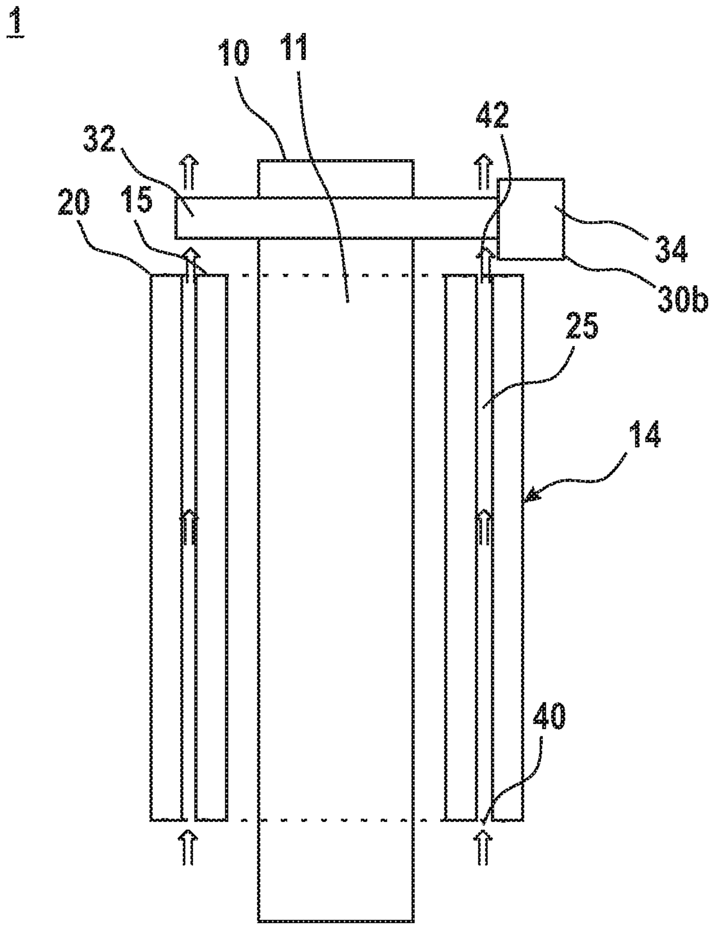
FIG. 2 shows a cross section through a dry-type transformer according to further embodiments.

FIG. 2 shows an exemplary embodiment in which a ring ventilator 30*b* is situated above the winding body 14. That is, the cooling air flow 35 is generated by suctioning air from the cooling air channel 25.

Figure 3:
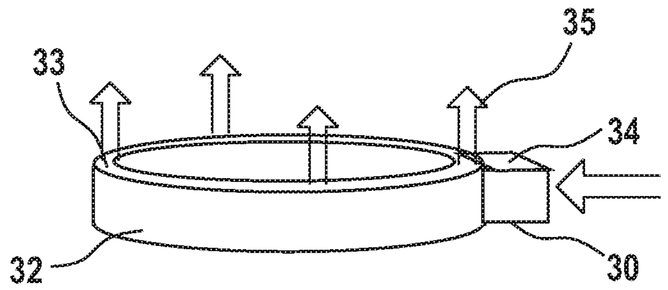
FIG. 3 shows a ring ventilator according to embodiments.

FIG. 3 shows an exemplary, nonlimiting example of a ring ventilator 30, 30*a*, 30*b* in the form of a bladeless ventilator. The cooling air stream 35 blown out from the slot 33 in the ring 32 is represented symbolically by arrows. Furthermore, at the right side the supply of cooling air to the blower 34 is shown. In exemplary embodiments, the cooling air flow is directed or guided to the blower 34 through a pipe or a conduit.

Figure 4:
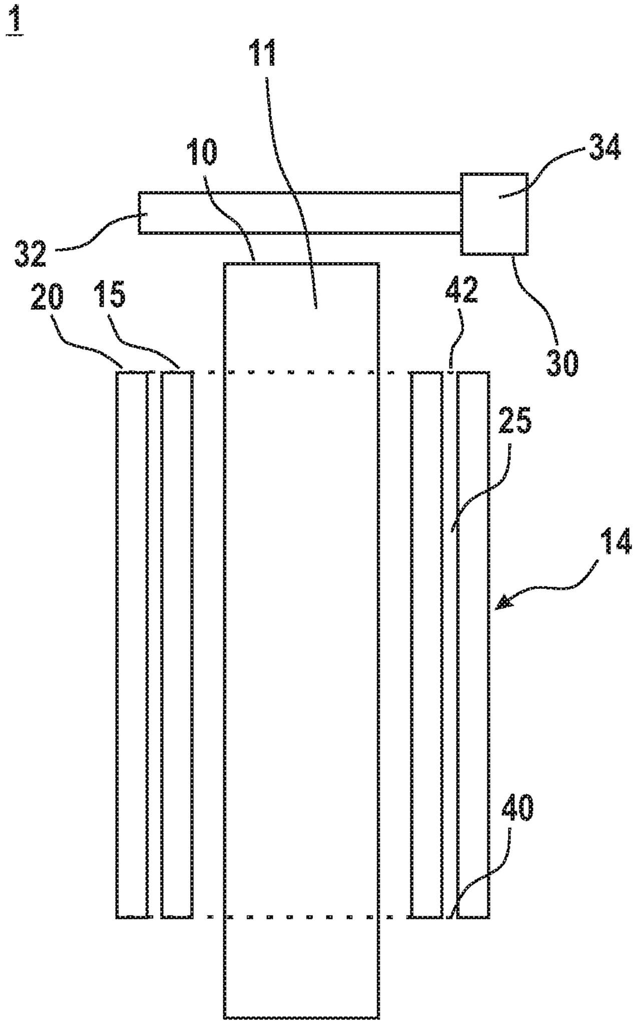
FIG. 4 shows a cross section through a dry-type transformer according to further embodiments.

FIG. 4 shows another embodiment in which the ring or bladeless ventilator is arranged, not on the core 10 or around it, as in the other examples, but instead outside and above the dry-type transformer 1 and the core 10. The ventilator may in this case be mounted, e.g., on a top side or cover of a housing, i.e., with no direct contact to the transformer 1 itself.

Figure 5:
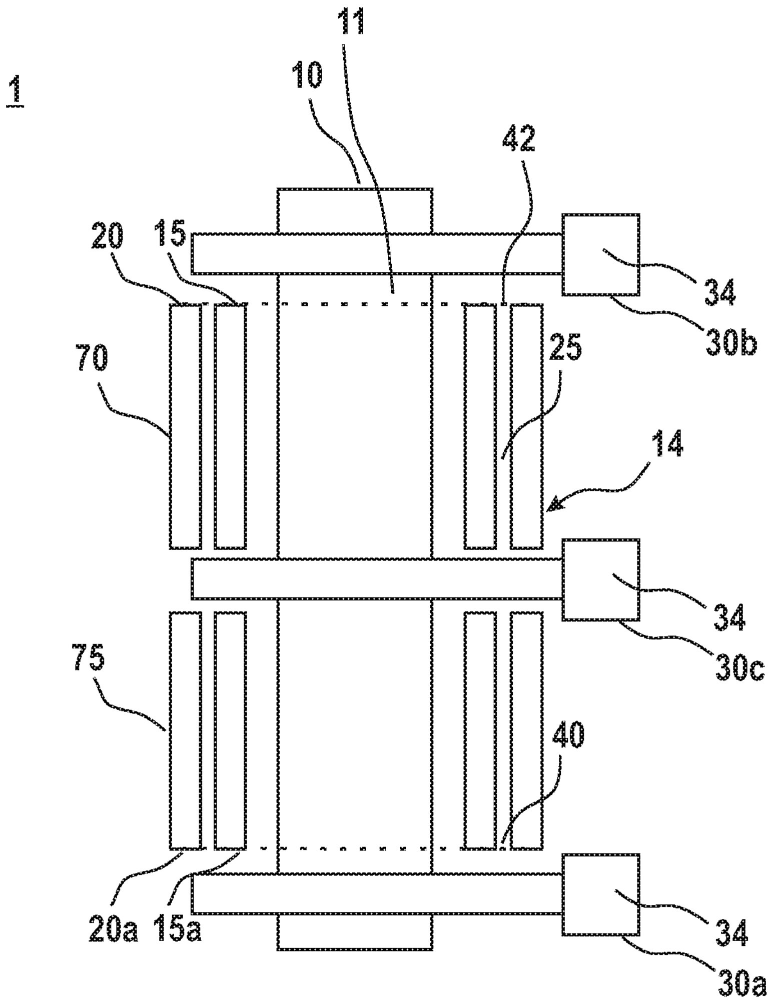
FIG. 5 shows a cross section through a dry-type transformer according to further embodiments.

FIG. 5 shows a dry-type transformer 1 according to exemplary embodiments representing a combination of the variants of FIG. 1 and FIG. 2. In addition, the windings here are divided on the core or branch, so that a further ring or bladeless ventilator 30*c* is arranged between the winding segments 70, 75. That is, the ventilator 30*c* is arranged between two winding segments 70, 75 arranged separately in the longitudinal direction of the core 10. It works in blowing mode for one of the winding segments 70, and in suction mode for the other winding segment 75. In other embodiments, only the middle or central ring or bladeless ventilator 30*c* can also be used with such a transformer configuration.

Figure 6:
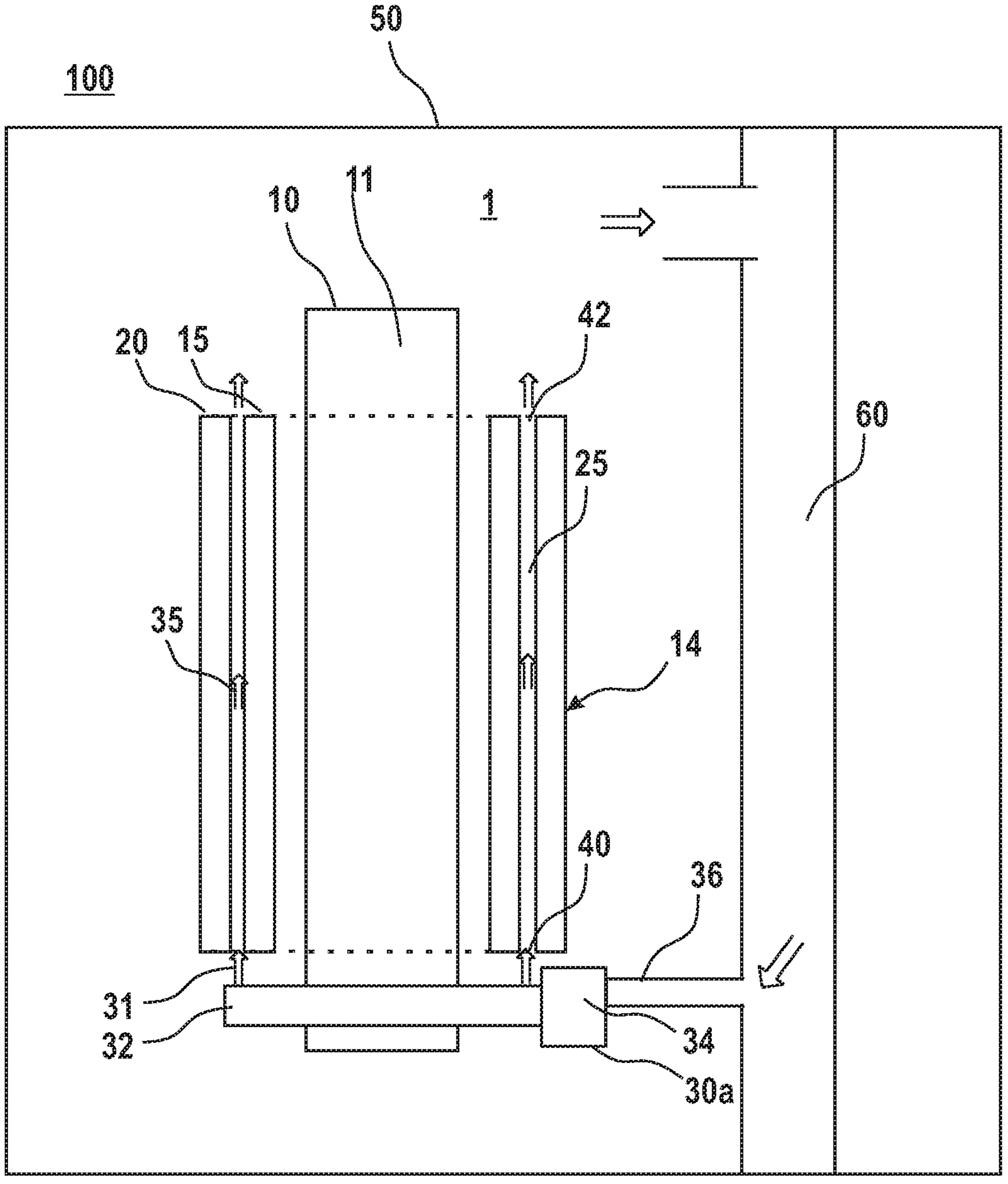
FIG. 6 shows a cross section through a cooling system for a dry-type transformer according to further embodiments.

FIG. 6 shows a transformer cooling system 100, having a dry-type transformer 1 according to one of the above described exemplary embodiments. The dry-type transformer 1 is located in a (substantially or entirely closed) housing 50. The cooling air of the cooling air flow 35 after passing through the cooling channel 25 is led into a heat exchanger 60. This serves to carry waste heat away from the housing 100, to the surrounding air, or also to a cooling circuit with a fluid such as water.

The cooling air flow 35 heated by the dry-type transformer 1 is thus taken after passing through the cooling channel 25 of the dry-type transformer 1 to the heat exchanger 60 and is cooled there. The cooled air flow is then sucked again by the blower 34 of the ring or bladeless ventilator 30*a* (or a plurality of such ventilators) by means of a pipe 36. Thus, a closed cooling air circuit exists.

Figure 7:
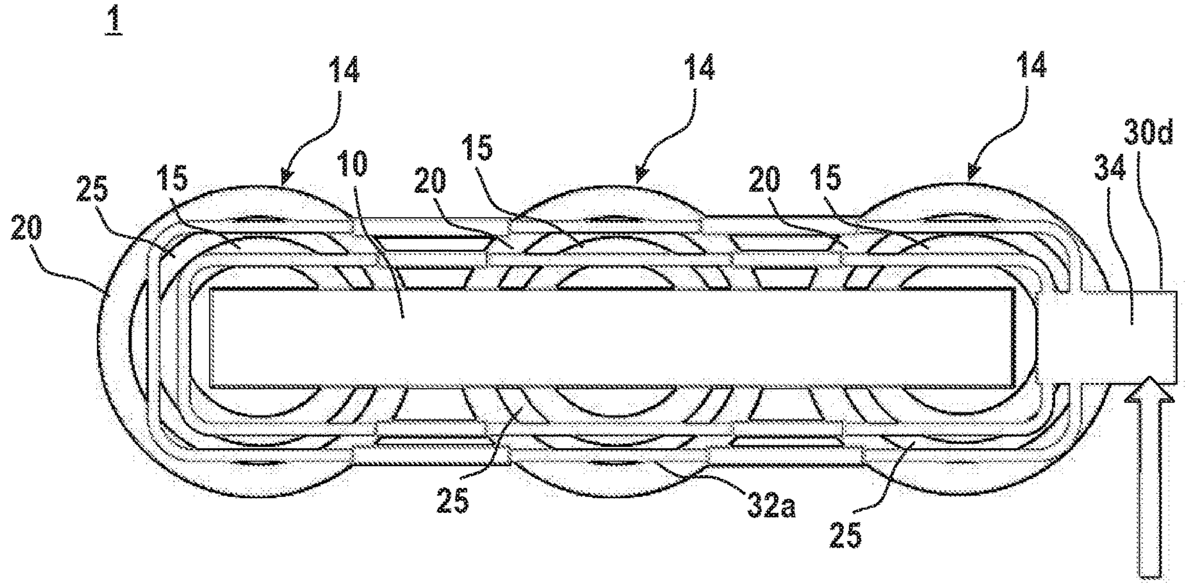
FIG. 7 shows a top view of a dry-type transformer according to further embodiments.

FIG. 7 shows a bottom view of a dry-type transformer 1 with three branches 11, such as a three-phase transformer. Only one bladeless ventilator 30*d* is used, whose ring 32*b* is elongated or stretched out in order to cover all three winding bodies 14. Alternatively, one or more ventilators may also be provided for each branch 11 or winding body 14, as described in the example of FIG. 1 and FIG. 5.

In general, the ring or bladeless ventilators 30, 30*a*, 30*b*, 30*c* described here by exemplary embodiments can be used for the cooling of all kinds of electrical power appliances 2, such as electric motors, generators, semiconductor power layouts, etc. For this, the power appliance 2 is provided with an opening 40, 42 of a cooling channel 25 adapted to the geometry of the cooling air current. The elongated or stretched out ring 32*a* of the bladeless ventilator may also assume shapes other than circular, such as elliptical, square, or rectangular.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air-cooled dry-type transformer, comprising:

a core provided with a branch;

a winding body arranged about the branch;

a cooling channel extending in a direction of a longitudinal axis of the winding body, the cooling channel being arranged between an inner part of the winding body and an outer part of the winding body, the cooling channel having an opening at each end of the cooling channel and a substantially ring-shaped cross section with a round, oval, or polygonal basic shape; and at least one ring ventilator comprising a ring and a blower, the blower being configured to suction air and to blow the air from the ring along a longitudinal axis of the ring, thereby generating an air flow, wherein the at least one ring ventilator is dimensioned and mounted such that the air flow generates a cool air flow in the cooling channel, the at least one ring ventilator comprising a first ring ventilator and a second ring ventilator, the first ring ventilator being configured to blow air into the cooling channel through a first opening at a first end of the cooling channel and the second ring ventilator being configured to suck air out from the cooling channel through a second opening at a second end of the cooling channel.

2. The air-cooled dry-type transformer according to claim 1, wherein the air flow in its cross section profile corresponds substantially to a cross section profile of at least one of the openings of the cooling channel.

3. The air-cooled dry-type transformer according to claim 1, wherein the cooling channel has an inner cooling channel diameter d1 and an outer cooling channel diameter d2, in which air flow flows to or from the cooling channel between an inner air flow diameter dks1 and an outer air flow diameter dks2 of the air flow, respectively.

4. The air-cooled dry-type transformer according to claim 1, further comprising at least one further ring ventilator, which is arranged on the branch between two winding body segments mounted separately in a longitudinal direction of the branch, respectively comprising an inner part of the winding body segment and an outer part of the winding body segment, and being configured to work in a blowing mode for one of the winding body segments and in a suction mode for the other winding body segment.

5. The air-cooled dry-type transformer according to claim 1, wherein the dry-type transformer comprises a three-phase transformer and has three branches with three winding bodies, respectively, each winding body being arranged about a branch of a core, and wherein the three-phase transformer further comprises either:

a ring ventilator arranged on each branch of the transformer, or a common ring ventilator, whose elongated ring extends over all three winding bodies and is configured to blow air respectively into cooling channels of the individual winding bodies.

6. A transformer cooling system, comprising:

the dry-type transformer according to claim 1;

a housing for the dry-type transformer; and a heat exchanger, which is configured to carry heat away from the housing, wherein a cooling air flow generated by the at least one ring ventilator after passing through the cooling channel of the dry-type transformer impinges on the heat exchanger and is cooled there.

7. The air-cooled dry-type transformer of claim 1, further comprising:

a housing for the air-cooled dry-type transformer.

8. The air-cooled dry-type transformer of claim 7, further comprising:

a heat exchanger configured to carry heat away from the housing, wherein an air flow generated by the at least one ring ventilator after passing through the cooling channel of the dry-type transformer impinges on the heat exchanger and is cooled to generate a cooled air flow.

9. The air-cooled dry-type transformer of claim 7, wherein the at least one ring ventilator cooled air flow is sucked by the blower of the at least one ring ventilator.

10. The air-cooled dry-type transformer of claim 7 wherein the cooled air flow is sucked by the blower of the at least one ring ventilator via a pipe.

11. The air-cooled dry-type transformer of claim 7 wherein the heat exchanger is configured to carry heat away from the housing to surrounding air.

12. The air-cooled dry-type transformer of claim 7 wherein the heat exchanger is configured to carry heat away from the housing to a cooling circuit having a fluid.

13. The air-cooled dry-type transformer of claim 1, wherein the branch comprises a plurality of branches, wherein each branch of the plurality of branches has a winding body around the branch.

14. The air-cooled dry-type transformer of claim 1, wherein the at least one ring ventilator has a ring-shaped housing as a stator and a ring-shaped rotor on which blades are mounted.

15. The air-cooled dry-type transformer of claim 1, wherein the at least one ring ventilator comprises a bladeless ventilator where air is drawn through an internally installed rotor through holes and accelerates through a slot provided therein.

* * * * *